(12) United States Patent
Boonstra

(10) Patent No.: US 8,991,794 B1
(45) Date of Patent: Mar. 31, 2015

(54) HUMIDIFIER UTILIZING FILTERED WATER

(76) Inventor: Keith E. Boonstra, Holland, MI (US)

( * ) Notice: Subject to any disclaimer, the term of this patent is extended or adjusted under 35 U.S.C. 154(b) by 934 days.

(21) Appl. No.: 12/940,142

(22) Filed: Nov. 5, 2010

Related U.S. Application Data

(60) Provisional application No. 61/258,394, filed on Nov. 5, 2009.

(51) Int. Cl.
*B01F 3/04* (2006.01)
*B01D 39/06* (2006.01)

(52) U.S. Cl.
CPC .............. *B01D 39/06* (2013.01); *Y10S 261/65* (2013.01)
USPC ................. 261/5; 261/78.2; 261/DIG. 65

(58) Field of Classification Search
USPC ............... 261/5, 34.1, 37, 78.2, 115, DIG. 65
See application file for complete search history.

(56) References Cited

U.S. PATENT DOCUMENTS

| 4,255,360 | A | * | 3/1981 | Jeffries | 261/5 |
| 6,092,794 | A | * | 7/2000 | Reens | 261/115 |
| 7,211,320 | B1 | | 5/2007 | Cooper et al. | |
| 7,419,601 | B2 | | 9/2008 | Cooper et al. | |
| 7,552,914 | B1 | * | 6/2009 | Feldstein | 261/4 |
| 2004/0020998 | A1 | * | 2/2004 | Stueble | 239/14.1 |

* cited by examiner

*Primary Examiner* — Charles Bushey
(74) *Attorney, Agent, or Firm* — Price Heneveld LLP

(57) ABSTRACT

A humidifier is provided that typically includes a water filtration unit and a pump that draws filtered water from the water filtration unit, typically a carbon nanotube filter. The humidifier further includes a nozzle having an outlet orifice, wherein the nozzle is connected to the pump, where the pump forces the filtered water through the nozzle, thereby expelling the filtered water into an atmosphere in the form of a purified vapor or mist.

20 Claims, 6 Drawing Sheets

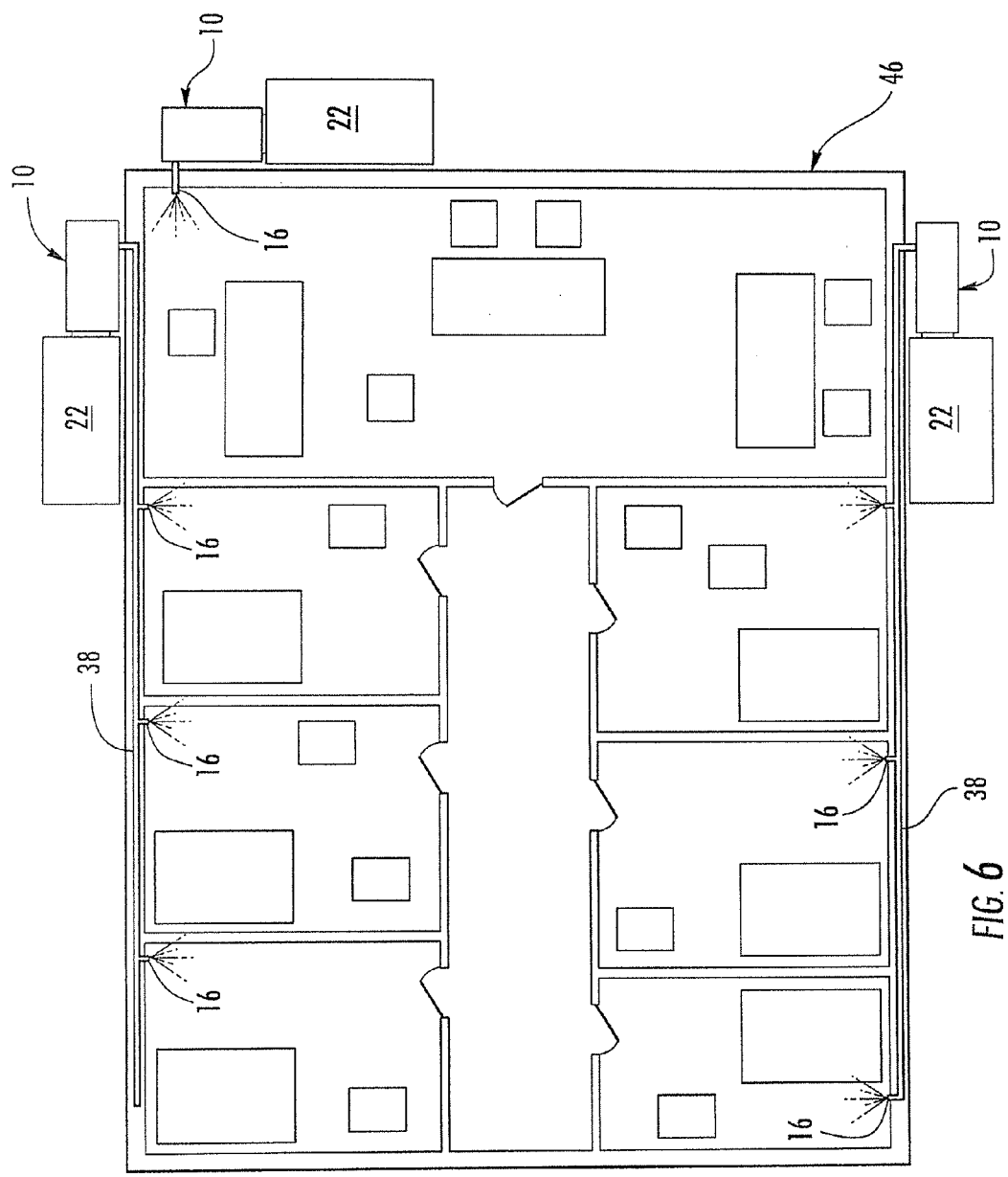

HUMIDIFIER UTILIZING FILTERED WATER

CROSS REFERENCE TO RELATED APPLICATION

This application claims priority to and the benefit of provisional application Ser. No. 61/258,394, filed on Nov. 5, 2009, entitled HUMIDIFIER UTILIZING FILTERED WATER, the entire disclosure of which is hereby incorporated by reference.

FIELD OF THE INVENTION

The present invention generally concerns air humidification regulation and a device or system for adding humidity to the air.

SUMMARY OF THE INVENTION

One embodiment of the present invention includes a humidifier having a water filtration unit and a pump that draws filtered water from the water filtration unit. The humidifier further includes at least one nozzle connected to the pump that forces the filtered water through the nozzle, thereby expelling the filtered water into an atmosphere in the form of a purified vapor or mist through an outlet orifice in the nozzle(s).

Another embodiment of the present invention includes a humidifier system that includes a humidifier utilizing filtered water. The system includes a device for filtering water as the water passes through the device. The device is operably connected to a water source that supplies water to the device. A high-pressure pump is driven by a motor. Generally, at least one pulley operably connects the motor to the pump or a unitary pump and motor not employing pulleys may be used to move (draws) filtered water through the device for filtering water and through at least one conduit operably connected to the device for filtering water at one end and at least one nozzle having an outlet orifice. The pump drives the filtered water through the nozzle(s), thereby expelling the filtered water into an atmosphere in the form of a purified vapor or mist. A humidistat is in operable communication with the humidifier that measures and at least optionally controls the atmosphere humidity level in a (predetermined) space and directs the humidifier to produce and deliver to the space an amount of purified vapor or mist to achieve a user selected humidity level in the space.

Another embodiment of the present invention includes a method for controlling the humidity of an atmosphere in a predetermined volume, typically a room, a set of rooms, or the interior of an entire building structure. The method includes providing a water filtration unit, a pump that moves (draws) filtered water through the water filtration unit, and forces water through at least one nozzle having an outlet orifice. The nozzle(s) is connected to the pump, wherein the pump moves the filtered water through the orifice of the nozzle or nozzles thereby expelling the filtered water into the atmosphere of the predetermined volume in the form of a purified vapor or mist. The method further typically includes the steps of obtaining or drawing water from a water source into and through the water filtration unit, thereby purifying the water, driving the pump to draw or otherwise move the purified water from the water filtration unit through one or more conduits to the nozzle or nozzles. This is typically done by subjecting the purified water to a high pressure, forcing the purified water through the nozzle and orifice. The high pressure transfer through the nozzle results in the vaporization of the purified water and the expelling of the purified vapor into the atmosphere (air).

Additional objects, features, and advantages of the present invention will become more readily apparent from the following detailed description of the preferred embodiments when taken in conjunction with the drawings, wherein like reference numerals refer to corresponding parts in the several views.

BRIEF DESCRIPTION OF THE DRAWINGS

FIG. 6 is a top plan view of a floor plan of a building including a humidifier system according to an embodiment of the present invention.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
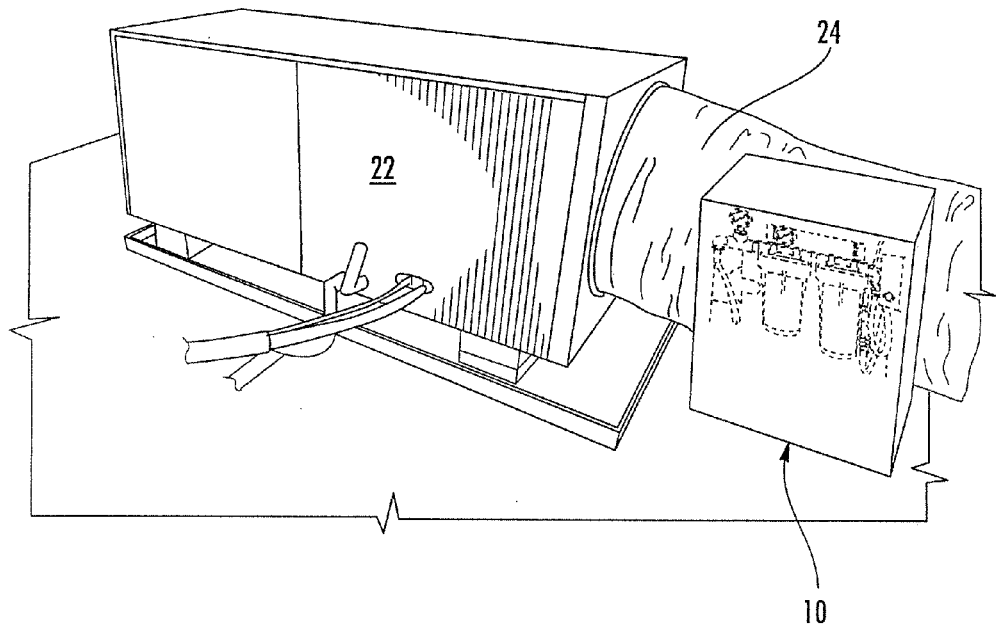
FIG. 1 is an elevated perspective view of a humidifier of an embodiment of the present invention associated with a heating and air conditioning system.

Referring to FIG. 1, the reference number 10 generally designates a humidifier according to an embodiment of the present invention. In the illustrated example, the humidifier includes a water filtration unit 12, from which a pump 14 moves, typically draws, filtered water. At least one nozzle having an outlet orifice 18 is operably connected to the pump through a conduit 38, which is typically a rubber or other elastomeric tubing, but can also be a metal conduit or a combination of elastomeric and metal piping, and the pump 14 forces the filtered water through the nozzle(s) 16, thereby expelling the filtered water into an atmosphere in the form of a purified vapor or mist 20.

The illustrated humidifier in FIG. 1 is shown as part of a larger ventilation system or heating and air conditioning unit 22. One or more such ventilation systems are typically present in residential or commercial building structures. The humidifier may be directly associated with the ventilation system or remotely located and operably associated with such a ventilation system. The purified water vapor or mist may be injected into the air ducting 24 at any location along the airflow path of the ducting in the structure. The humidifier functions to affect humidity conditions within an atmosphere.

Figure 2:
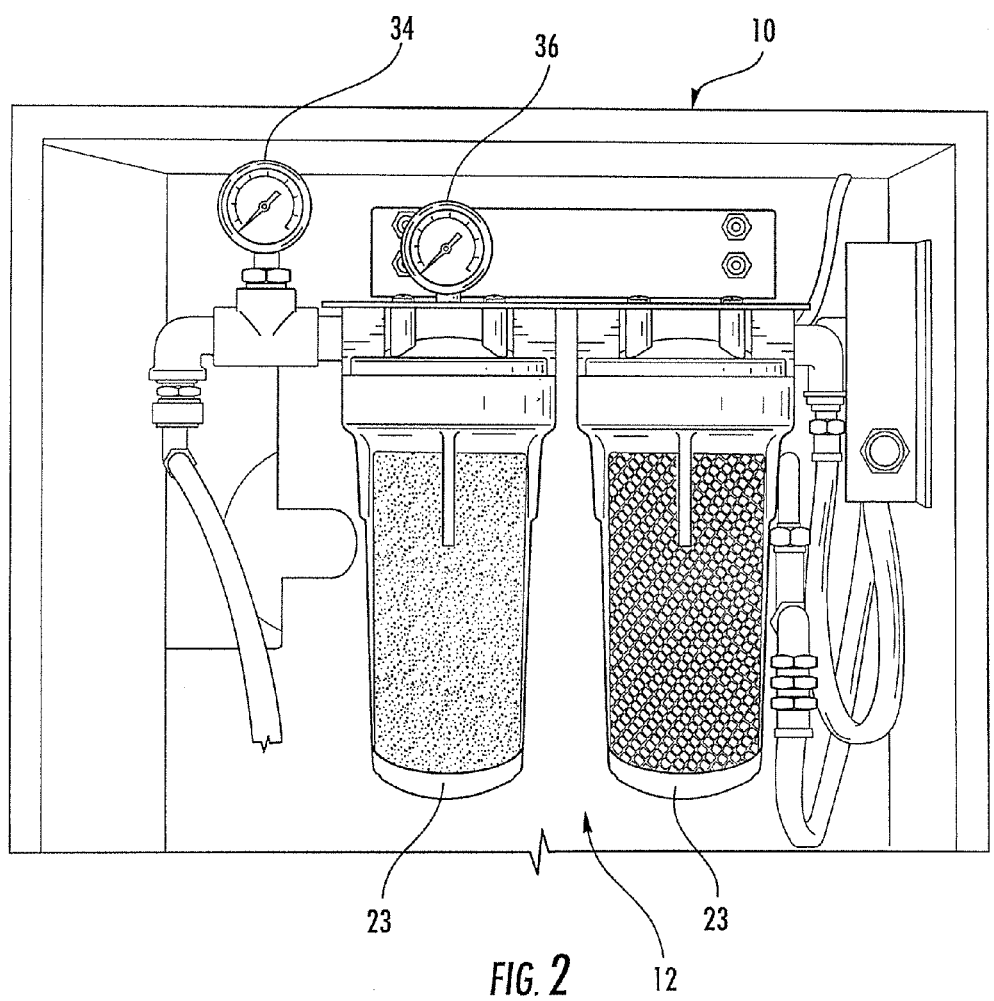
FIG. 2 is an elevational front view of a humidifier according to an embodiment of the present invention where the humidifier includes a carbon nanotube water filtration system.

Referring to FIG. 2, a water filtration unit is illustrated. The water filtration unit includes one or more filters that are connected to a water source via plumbing conduits that are elastomeric and/or metal. The water source is typically a conventional plumbing system, where water is automatically provided, or the sourcing of water may be manual, such as where a user manually supplies water. In the typical plumbing system, water is introduced into the humidifier via at least one pipe that has removable engagement with the plumbing system and the humidifier. The water filtration unit purifies water by removing bacteria, viruses, cysts, metals, and other contaminants without the need for heat, ultraviolet light, chemicals, or electricity. Although any mentioned method to remove contaminants similar to that described herein may be employed, it is envisioned that a carbon nanotube material will be employed to absorb containments from the water. The filters may be positioned within the pipe that is connected to the water source or may be within one or more canisters 23 that typically have an inner carbon nanotube material that may be carbon nanotube fibers and/or an inner coating of carbon nanotube material. The carbon nanotube material is effective at absorbing contaminants larger than about 50 nanometers, resulting in purified water. One particularly preferred filter system is the WATER TAP™ water purification filter from Seldon Technologies, Inc. of Woodstock, Vt. The filtering system may contain nanomaterials and/or incorporate nanomesh for purifying liquids as described in U.S. Pat. Nos. 7,211,320 and 7,419,601 respectively, both of which are hereby incorporated by reference in their entireties. The purified water of the present invention typically has at least about 99.9999% of bacterial contaminants removed and at least about 99.99% of viral contaminants removed from NSF P231 General Test Water with low turbidity and low total organic carbon.

Figure 3:
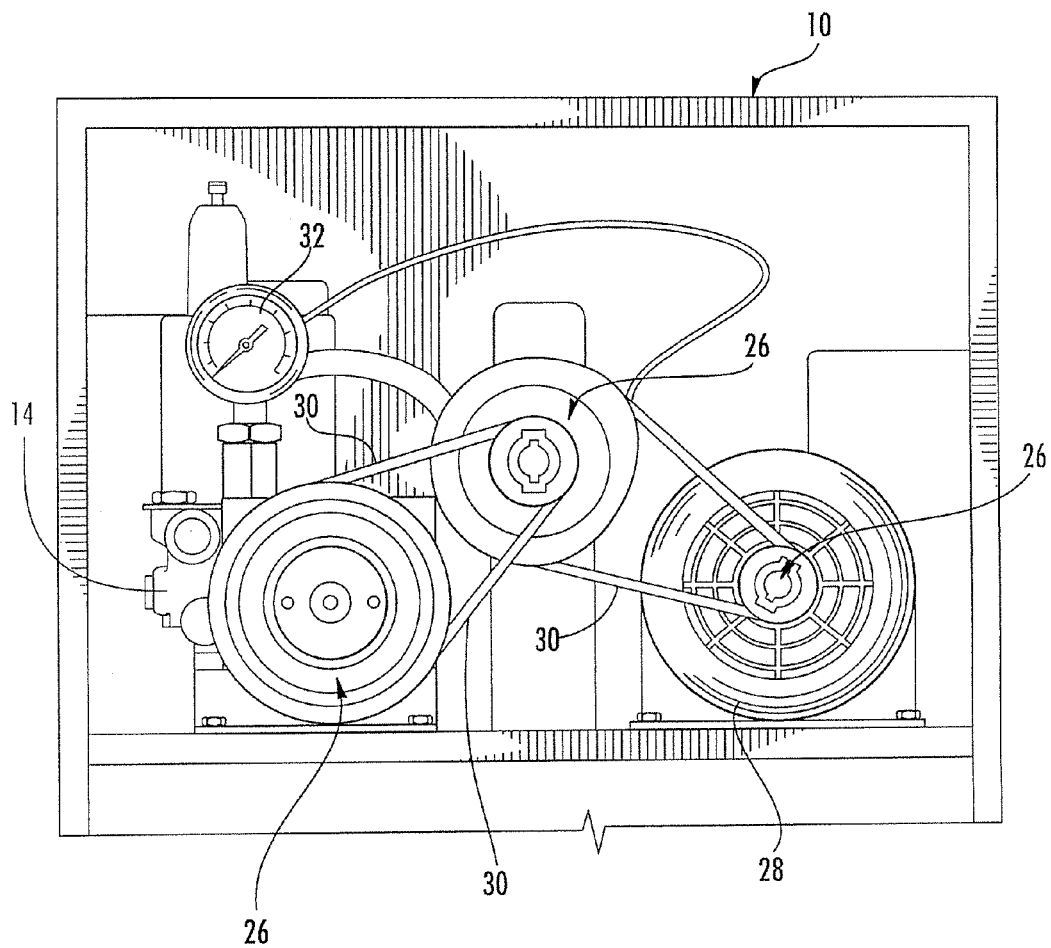
FIG. 3 is an elevational rear view of an embodiment of the present invention showing a pulley system associated with a pump.
Figure 4:
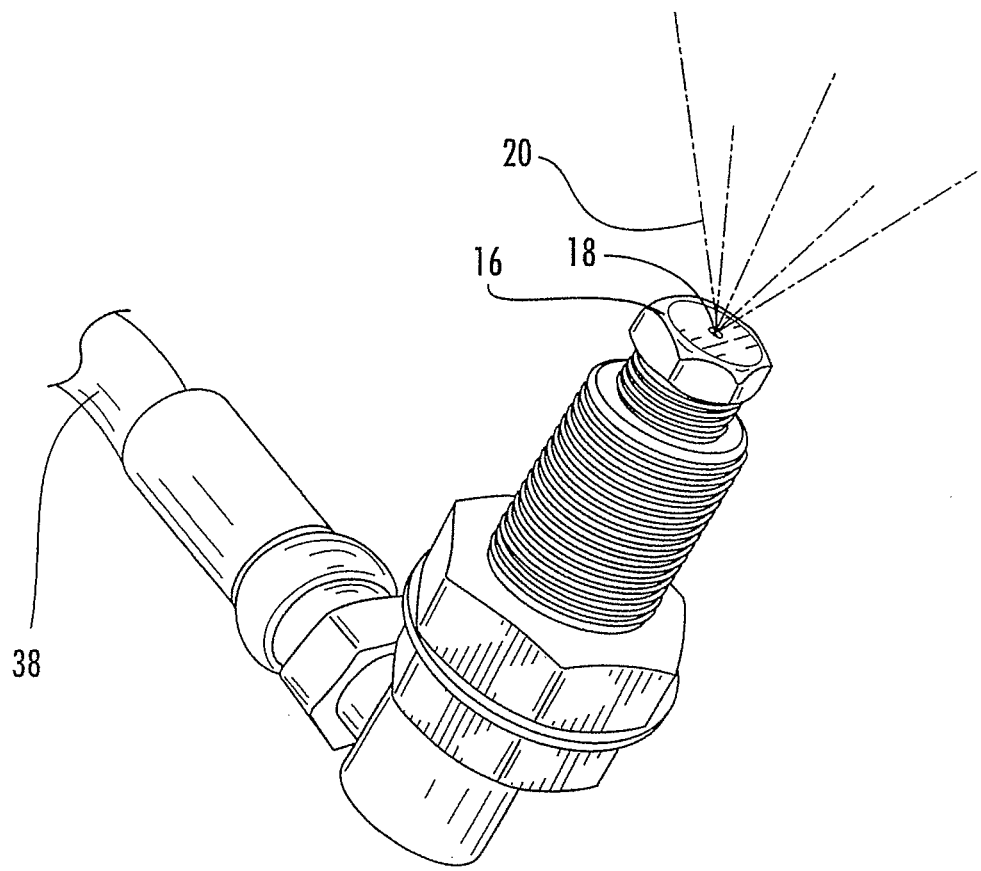
FIG. 4 is an elevated perspective view of a nozzle having an orifice according to an embodiment of the present invention.

Pump 14 is operably connected with water filtration unit 12 and moves, typically draws, the purified water through water filtration unit 12, typically at a high pressure (>1000 psi). The pump may be driven by a pulley system 26 powered by a motor 28 and driven by belts 30, as shown in FIG. 3. The pump system typically also includes a pressure gauge 32. As an alternative to a pulley driven pump, a unitary motor and pump may be employed to force water at a high pressure. The pump is typically capable of pumping water at a rate of at least about 2.0 gallons per hour, more typically 0.54 gallons through the water filtration unit. This pumping rate may increase depending on the volume of space being humidified. The amount could be as high as from about 20 to about 100 gallons per hour if an entire hospital floor, for example, were being humidified The rate can be adjusted based upon volume. Such a flow rate causes the water filtration unit to effectively remove contaminants. The water filtration unit typically has an outlet pressure gauge 34 and an inlet pressure gauge 36.

During operation of the pump, the filtered water that is drawn through the water filtration unit is forced through the nozzle having an outlet orifice. The nozzle 16 is operatively connected to the pump and water filtration unit via at least one conduit 38, which, as discussed above, is typically elastomeric tubing and/or metal piping that, allows water to flow therethrough even when the water is under pressure. The nozzle includes a polypropylene filter having a diameter of approximately seventy microns. The outlet orifice 18 of the nozzle has a diameter of typically approximately 0.015 inches or less. While passing through the nozzle, the filtered water is subjected to high pressure of approximately 3,000 psi or less or, more typically, about 1,000 psi or less. Water flows through the nozzle at a rate of between the range of at least 0.54 to 2.82 gallons per hour. The high pressure combined with the small outlet orifice diameter expels the filtered water into the atmosphere in atomized form. The particle size is typically small enough to dissipate or evaporate within about 10 seconds. Such pure vapor provides the ability to humidify a room, while preventing the introduction of contaminants into the atmosphere.

Figure 5:
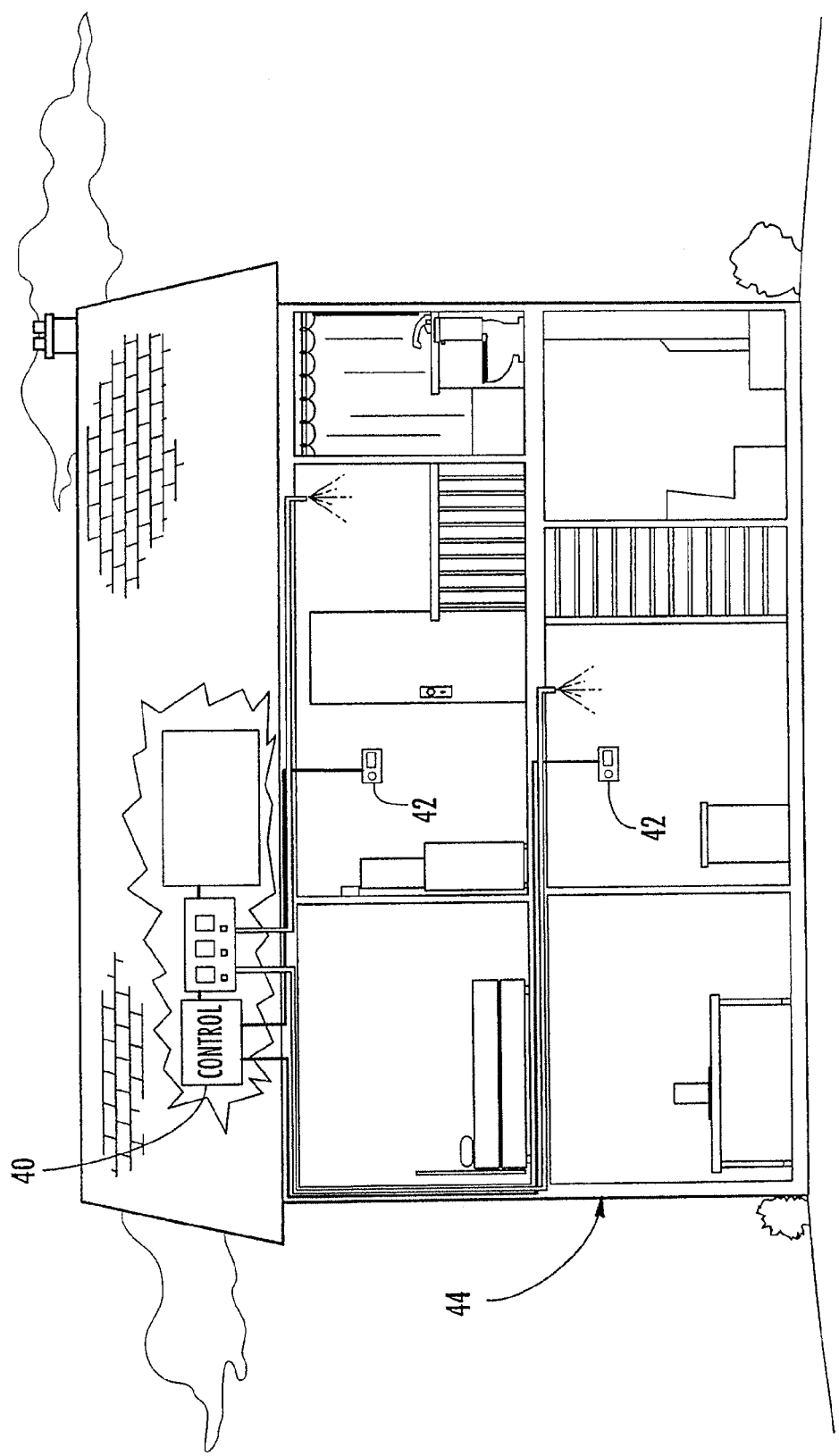
FIG. 5 is an elevation section view of a residential home including a humidifier system according to an embodiment of the present invention.

Referring to FIGS. 5 and 6, the present invention also includes a humidification system. The system generally includes one or more humidistats 42 associated with one or more humidifier(s) 10 of the present invention. The humidistat(s) is (are) typically capable of measuring humidity levels in the atmosphere of a predefined area or areas. They are also typically capable of controlling the operation of the humidifier or providing data to a control unit 40 that can activate the humidifier and optionally various conduit valves to deliver purified humidifying air to one or more predefined spaces within a building.

A user may employ the humidistat(s) to control the humidity level of the atmosphere in a number of ways. A user may simply manually adjust the humidity level by interacting with a control interface, such as a digital readout with buttons or knobs to enter desired humidity levels. Additionally, the user may manually program the humidistat to automatically achieve various humidity levels at different ambient temperatures. As an alternative to local and direct manual control, the humidistat may be linked to a computer system that is accessible to the internet and capable of accessing code on a server via the internet or code stored within a memory subsystem of a computer containing a processor where the code is stored locally on the computer. The user can use the computer system to regulate the humidity level in one or a plurality of areas within a building structure. This would allow a user to remotely control the humidity level in the atmosphere or space that the humidifier is configured to control. Such control may be desirable in a large structure, particularly when more than one of the rooms' humidity level is being controlled by the humidifier. As shown in FIGS. 5 and 6 a plurality of nozzles 16 supply vapor directly to each individual room in a home 44 or, for example, a commercial building 46 such as an office or hospital (see general layout of FIG. 6). Additionally, so the nozzle is not viewable in a room, the nozzle might add the purified water vapor to the air ducting system proximate where the air enters the room or other predefined area. This is typically more preferred given its unobtrusive and unseen configuration to the individuals within the building or building space.

Referring to FIGS. 5 and 6, the humidifier may be employed in a residential home 44 or in a commercial building 46. By providing a plurality of humidistats or linking the humidifier control to a computer control system, various humidity levels in different rooms of a structure may be regulated, controlled, and achieved. This is particularly beneficial in buildings that may require different humidity levels in different rooms and/or automatically regulated humidity levels, such as a hospital. While a hospital requires different humidity levels in different areas, the prevention of contaminants in the atmosphere is also of particular importance. Such objectives are achieved by the present invention through the invention use of the carbon nanomaterials that produce highly pure and essentially bacterial and viral free water that is also free of other contaminants. Because of the highly pure nature of the water the orifice of the nozzle can be sized to create water vapor that easily evaporates into the air without water condensing on a surface within a room or air flow ducting or other conduit. When associated with the structure's ventilation system, as previously discussed, the ability to measure and control humidity levels in various portions of the structure is present and such humidity levels can be measured with one or more humidistats and automatically regulated through the use of a computer system.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A humidifier comprising:
a water filtration unit;

a pump configured to draw filtered water from the water filtration unit; and a nozzle having an outlet orifice, wherein the nozzle is connected to the pump by a conduit, wherein the pump forces the filtered water through the nozzle, thereby expelling the filtered water into an atmosphere in the form of a purified vapor or mist, and wherein either:

(1) the water filtration unit removes all contaminants larger than about 50 nanometers or;

(2) the water filtration unit includes a carbon nanotube material, wherein the carbon nanotube material absorbs contaminants passing through the water filtration unit.

2. The humidifier of claim 1, wherein the nozzle includes a 70 micron polypropylene filter and the outlet orifice of the nozzle has a diameter of about 0.015 inch or less.

3. The humidifier of claim 1, wherein the pump is a plunger pump capable of pumping water at a rate of at least 0.54 gallons per hour through the water filtration unit.

4. The humidifier of claim 3, wherein the nozzle includes a 70 micron polypropylene filter and the outlet orifice of the nozzle has a diameter of about 0.015 inch or less.

5. The humidifier of claim 1, wherein the nozzle is configured such that water flows through the nozzle at a rate of between 0.54 to 2.82 gallons per hour.

6. The humidifier of claim 1, wherein the nozzle is configured to produce water pressure of up to 3000 psi during displacement of the filtered water through the nozzle.

7. The humidifier of claim 1, wherein the nozzle is configured to expel the filtered water into the atmosphere as a mist at 350 psi and a vaporized fog at 700 psi.

8. A humidifier system comprising:
a humidifier utilizing filtered water comprising:

a device for filtering water as the water passes through the device, wherein the device is operably connected to a water source and comprises a carbon nanotube material that absorbs contaminants passing through the device for filtering water as the water passes through the device;

a high-pressure pump driven by a motor that is operably connected with the device, wherein the high-pressure pump is configured to move filtered water through the device for filtering water and through a conduit operably connected to a nozzle having an outlet orifice wherein the high-pressure pump is further configured to drive the filtered water through the nozzle, and wherein the nozzle expels the filtered water into an atmosphere in the form of a purified vapor or mist; and a humidistat in operable communication with the humidifier that measures and at least optionally controls an atmosphere humidity level in a space and directs the humidifier to produce and deliver to the space an amount of purified vapor or mist to achieve a preselected humidity level in the space.

9. The humidifier system of claim 8, wherein a filtered water flow rate through the nozzle is between 0.54 and 2.82 gallons per hour.

10. The humidifier system of claim 8, wherein the pump is a plunger pump capable of pumping water at a rate of at least 0.54 gallons per hour through the device and the device removes all contaminants larger than about 50 nanometers.

11. The humidifier system of claim 8, wherein the nozzle includes a 70 micron polypropylene filter and the outlet orifice of the nozzle has a diameter of about 0.015 inch or less.

12. The humidifier system of claim 11, wherein a filtered water flow rate through the nozzle is between 0.54 and 2.82 gallons per hour.

13. The humidifier system of claim 8, wherein the nozzle is configured to produce a water pressure of up to about 3000 psi during displacement of the filtered water through the nozzle.

14. The humidifier system of claim 8, wherein the filtered water at a point of expulsion into the atmosphere is a mist at 350 psi and a vaporized fog at 700 psi.

15. The humidifier system of claim 8, wherein the humidistat includes a digital display, an outdoor air sensor, and wherein the humidistat automatically lowers and raises the humidity as the outdoor air temperature changes.

16. A method for controlling the humidity of an atmosphere comprising the following steps:

providing a water filtration unit; a pump configured to draw filtered water from the water filtration unit; and a nozzle having an outlet orifice, wherein the nozzle is connected to the pump by a conduit, wherein the pump forces the filtered water through the nozzle, thereby expelling the filtered water into an atmosphere in the form of a purified vapor or mist;

drawing water from a water source into the water filtration unit, thereby purifying the water;

driving the pump to draw the purified water from the water filtration unit and subjecting the purified water to a high pressure;

forcing the purified water through the nozzle and orifice, wherein the high pressure transfer through the nozzle results in an atomization of the purified water; and wherein the purified water is atomized by subjecting the purified water to a pressure of up to 3000 psi during displacement through the nozzle; and expelling the purified mist or vapor into the atmosphere.

17. The method for controlling the humidity of an atmosphere of claim 16, wherein the water filtration unit includes a carbon nanotube material, and wherein the step of passing the water through the water filtration unit includes absorbing contaminants from the water to the carbon nanotube material.

18. The method for controlling the humidity of an atmosphere of claim 16, further comprising the step of driving the pump with a motor and wherein the water filtration unit removes contaminants larger than about 50 nanometers.

19. The method for controlling the humidity of an atmosphere of claim 16, further comprising the step of providing a digital humidistat that includes a digital display, an outdoor air sensor, and wherein the digital humidistat automatically lowers and raises the humidity as the outdoor air temperature changes.

20. The method for controlling the humidity of an atmosphere of claim 16, wherein the water filtration unit removes contaminants larger than about 50 nanometers.

* * * * *